United States Patent
Russo et al.

(10) Patent No.: US 10,013,597 B2
(45) Date of Patent: *Jul. 3, 2018

(54) MULTI-VIEW FINGERPRINT MATCHING

(71) Applicant: Synaptics Incorporated, San Jose, CA (US)

(72) Inventors: Anthony P. Russo, New York, NY (US); Rohini Krishnapura, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,299

(22) Filed: Nov. 14, 2016

(65) Prior Publication Data
US 2017/0061196 A1 Mar. 2, 2017

Related U.S. Application Data

(63) Continuation of application No. 14/824,070, filed on Aug. 11, 2015, now Pat. No. 9,508,022.
(Continued)

(51) Int. Cl.
*G06K 9/62* (2006.01)
*G06K 9/00* (2006.01)
(Continued)

(52) U.S. Cl.
CPC ..... *G06K 9/00087* (2013.01); *G06K 9/00026* (2013.01); *G06K 9/00093* (2013.01);
(Continued)

(58) Field of Classification Search
CPC ........... G06K 9/00026; G06K 9/0006–9/0012; G06K 9/00221–2009/00328;
(Continued)

(56) References Cited

U.S. PATENT DOCUMENTS 5,067,162 A * 11/1991 Driscoll, Jr. ....... G06K 9/00067
382/126
5,892,838 A    4/1999 Brady
(Continued)

FOREIGN PATENT DOCUMENTS

EP    217426 B1    3/2012

OTHER PUBLICATIONS

Yin, Yilong, et al. "A framework of multitemplate ensemble for fingerprint verification." *EURASIP Journal on Advances in Signal Processing* Jan. 2012 (2012): 1-11.
(Continued)

*Primary Examiner* — Brian Werner
(74) *Attorney, Agent, or Firm* — Leydig, Voit & Mayer, Ltd.

(57) ABSTRACT

A method and a device are provided for performing a recognition process. The recognition process compares an individual fingerprint view to a fingerprint enrollment template in order to determine whether a match has been found. The determination of a match is based on individual match statistics collected between the individual fingerprint view and each view of the fingerprint enrollment template. Additionally, inter-view match statistics between each view of the fingerprint enrollment template may also be determined. The inter-view match statistics can be analyzed along with the individual match statistics to further inform the determination of a match between the individual fingerprint view and the fingerprint enrollment template.

28 Claims, 9 Drawing Sheets

Related U.S. Application Data

(60) Provisional application No. 62/036,037, filed on Aug. 11, 2014.

(51) Int. Cl.
    *G06K 9/52*    (2006.01)
    *G06K 9/66*    (2006.01)

(52) U.S. Cl.
    CPC .............. *G06K 9/52* (2013.01); *G06K 9/6202* (2013.01); *G06K 9/66* (2013.01)

(58) Field of Classification Search
    CPC ................ G06K 9/00885–2009/00966; G06K 9/00597–9/00617
    See application file for complete search history.

(56) References Cited

U.S. PATENT DOCUMENTS

| | | | |
|---|---|---|---|
| 2004/0052405 A1 | 3/2004 | Walfridsson | |
| 2005/0147282 A1* | 7/2005 | Fujii | G06K 9/00087 382/124 |
| 2005/0265587 A1* | 12/2005 | Schneider | G06K 9/00026 382/124 |
| 2006/0120575 A1* | 6/2006 | Ahn | G06K 9/00006 382/124 |
| 2007/0036398 A1 | 2/2007 | Chen | |
| 2008/0212846 A1* | 9/2008 | Yamamoto | G06K 9/00087 382/115 |
| 2010/0080425 A1 | 4/2010 | Bebis et al. | |
| 2013/0259330 A1 | 10/2013 | Russo et al. | |
| 2013/0272586 A1* | 10/2013 | Russo | G06K 9/00087 382/124 |
| 2014/0331059 A1* | 11/2014 | Rane | G06K 9/00093 713/186 |
| 2015/0186710 A1* | 7/2015 | Ahn | G06K 9/00087 382/124 |
| 2016/0026840 A1* | 1/2016 | Li | G06K 9/00013 348/77 |
| 2016/0110586 A1* | 4/2016 | Hayasaka | G06K 9/00281 382/118 |

OTHER PUBLICATIONS

PCT/US2015/044745 Third Party Observation submitted Nov. 14, 2016.
International Preliminary Report on Patentability issued in PCT Application No. PCT/US2015/044745, Feb. 23, 2017.

* cited by examiner

MULTI-VIEW FINGERPRINT MATCHING

CROSS REFERENCE TO RELATED APPLICATIONS

This application is a continuation of U.S. patent application Ser. No. 14/824,070, filed on Aug. 11, 2015, which claims the benefit of U.S. Provisional Patent Application Ser. No. 62/036,037, filed on Aug. 11, 2014.

FIELD OF THE INVENTION

This disclosure generally relates to electronic devices, and more particularly to electronic devices configured to perform a biometric recognition process.

BACKGROUND OF THE INVENTION

Biometric recognition systems are used for authenticating and/or verifying users of devices incorporating the recognition systems. Biometric sensing technology provides a reliable, non-intrusive way to verify individual identity for recognition purposes.

Fingerprints, like various other biometric characteristics, are based on unalterable personal characteristics and thus are a reliable mechanism to identify an individual. There are many potential applications for utilization of fingerprint sensors. For example, fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, in particular applications related to portable devices, may require recognition systems that are both small in size and highly reliable.

Sometimes, the sensor may only be large enough to capture a partial view of the biometric sample being sensed. For example, a partial fingerprint sensor will only be large enough to capture a partial image of a user's fingerprint. This can present several challenges when attempting to reliably recognize the pattern against a stored enrollment template using only the partial view. For one, this partial view provides less discriminative information for the matching system to utilize when attempting to reliably recognize the fingerprint against a stored enrollment template. Additionally, system may need to account for the user presenting different portions of the same fingerprint in different match attempts.

An enrollment template derived from multiple views of the enrolled fingerprint provides a possible solution, but attempting to perform matching between a candidate verification view and a larger enrollment template that is derived from multiple enrollment views is a challenging task.

One possible solution is to stitch together the multiple enrollment views into a single larger view. However, achieving a perfect alignment between the views is often not feasible, and inaccuracies in these alignments can produce distortions at boundaries and overlapping regions between the views that can detrimentally impact match performance.

Another possible solution is to store the enrollment views separately in the enrolled template, and compute individual match scores with each of the views separately. The overall score between the templates can then be based on a summation or other simple combination of the scores to the individual views. Geometric relationships between the enrollment views can be used to constrain the alignments from the verify view to each enrollment view in order to simplify the computation of each individual match score. However, this can cause false results because the overall score is a function of match scores to only the individual views. For example, the combination of individual scores can cause a false match when an imposter matches strongly with only a single view or small subset of views, and conversely, the combination of individual scores can cause a false non-match when a true user matches only weakly with several of the views.

In view of the above, there is a need for a recognition system that can provide a highly reliable recognition process based on a partial view or views of a user's fingerprint. Embodiments of the disclosure provide such a highly reliable recognition system for performing a recognition process based on the partial view or views of the user's fingerprint. These and other advantages of the disclosure, as well as additional inventive features, will be apparent from the description of the disclosure provided herein.

BRIEF SUMMARY OF THE INVENTION

One embodiment provides a method of biometric matching to an enrollment template. The method includes acquiring a verification template, the verification template including a verification view of a biometric sample captured by an input device. The method further includes comparing the verification view to a plurality of individual enrollment views of the enrollment template to determine individual match statistics between the verification view and the individual enrollment views. A composite match score between the verification template and the enrollment template is calculated as a function of the individual match statistics and of inter-view match statistics between at least one pairing of the individual enrollment views within the enrollment template. The composite match score is compared to a threshold, and a biometric match between the verification template and the enrollment template is indicated if the composite match score satisfies the threshold.

Another embodiment includes a device for biometric matching to an enrollment template. The device includes a processing system configured to acquire a verification template, the verification template including a verification view of a biometric sample captured by an input device. The processing system is further configured to compare the verification view to a plurality of individual enrollment views of the enrollment template to determine individual match statistics between the verification view and the individual enrollment views. The processing system is configured to calculate a composite match score between the verification template and the enrollment template as a function of the individual match statistics and of inter-view match statistics between at least one pairing of the individual enrollment views within the enrollment template. The processing system is configured to compare the composite match score to a threshold, and a biometric match between the verification template and the enrollment template is indicated if the composite match score satisfies the threshold.

Another embodiment includes a device for fingerprint matching to an enrollment template. The device includes a fingerprint sensor. and a processing system. The processing system is configured to acquire a verification template, the verification template including a verification view of a fingerprint sample captured by the fingerprint sensor. The processing system is further configured to compare the verification view to a plurality of individual enrollment views of the enrollment template to determine individual match statistics between the verification view and the individual enrollment views. The processing system is configured to calculate a composite match score between the verification template and the enrollment template as a function of the individual match statistics and of inter-view match statistics between at least one pairing of the individual enrollment views within the enrollment template. The processing system is configured to compare the composite match score to a threshold, and a fingerprint match between the verification template and the enrollment template is indicated if the composite match score satisfies the threshold.

BRIEF DESCRIPTION OF THE DRAWING(S)

The accompanying drawings incorporated in and forming a part of the specification illustrate several aspects of the present invention and, together with the description, serve to explain the principles of the invention. In the drawings:

FIG. 2b is an enhanced image of the fingerprint of FIG. 2a;

Figure 4:
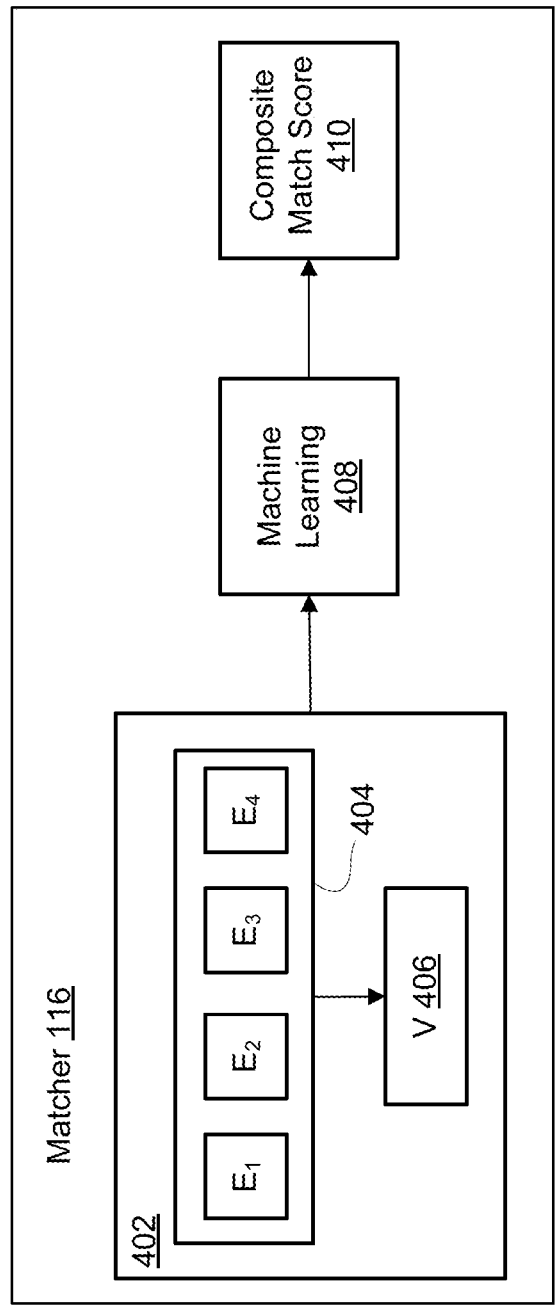
FIG. 4 is a block diagram of a matcher from the device of FIG. 1, in accordance with an embodiment of the invention.
Figure 7A:
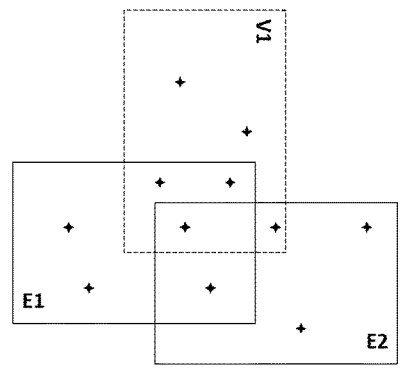
Figure 7B:
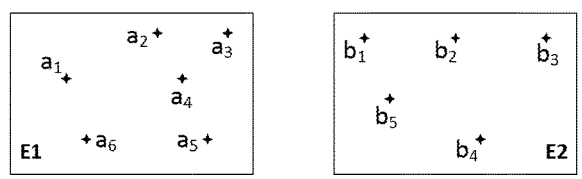
Figure 7C:
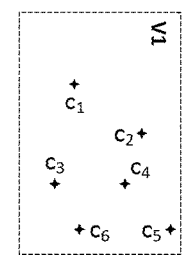
Figure 7C:
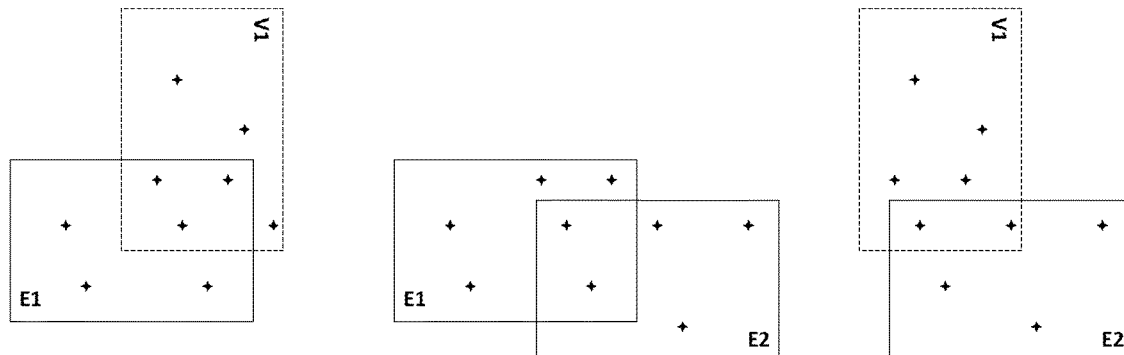
Figure 8:
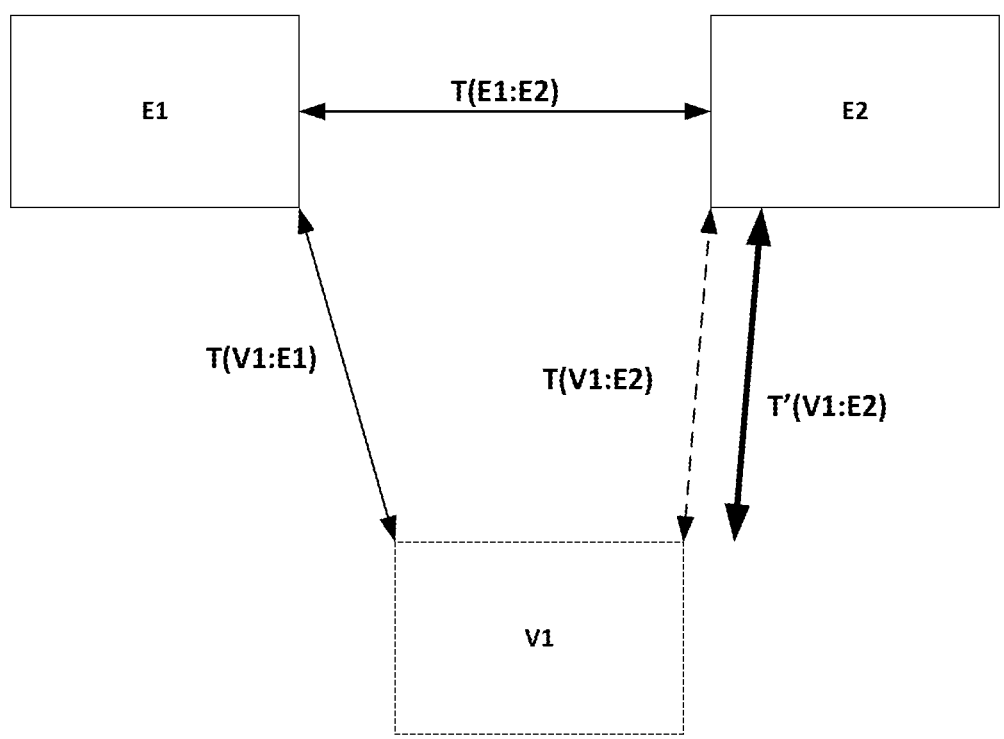
Figure 9:
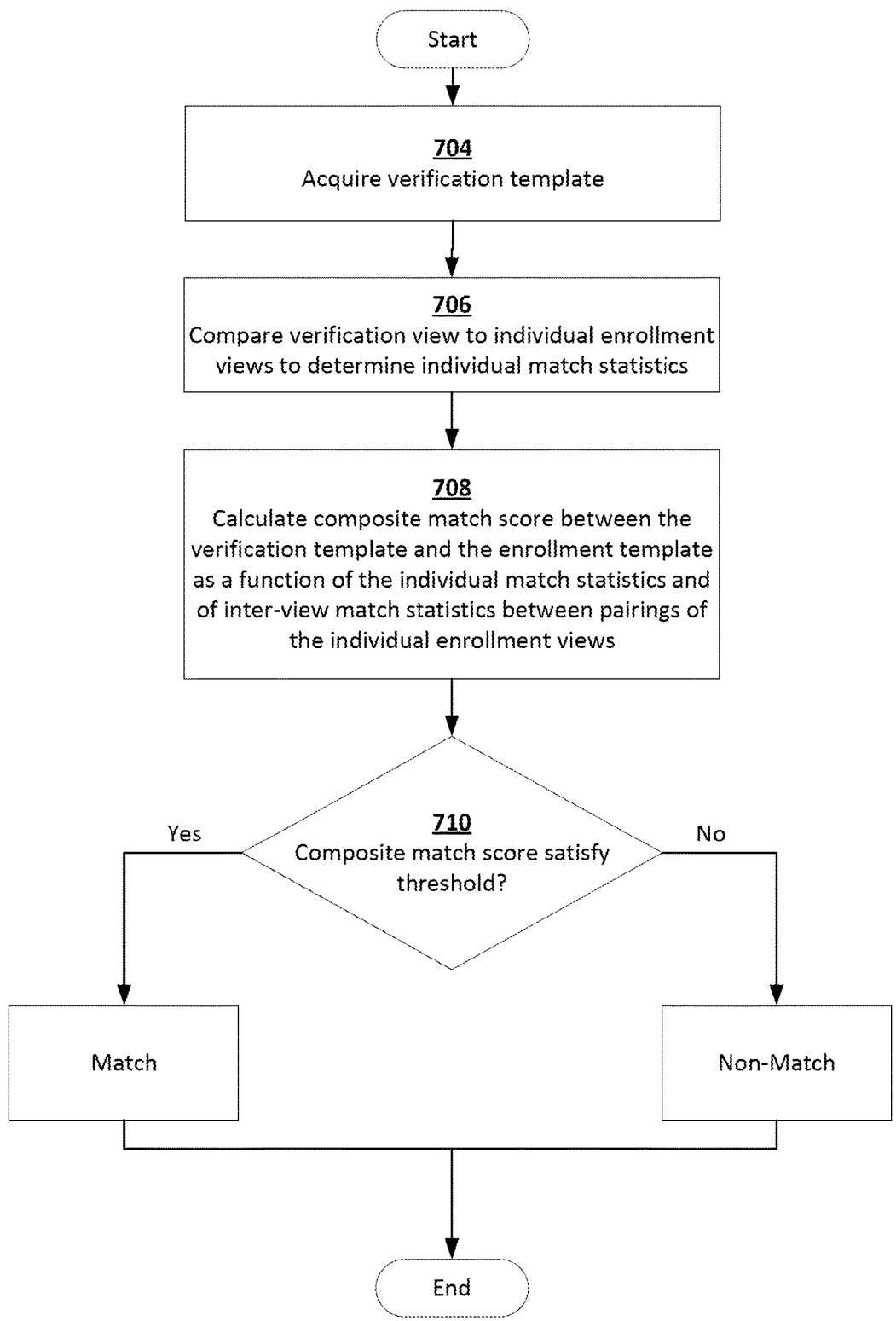

FIGS. 7(a)-7(c) are schematic diagrams of a recognition process, in accordance with an embodiment of the invention;

FIG. 8 is a schematic diagram of fingerprint views and associated geometric transformations, in accordance with an embodiment of the invention; and FIG. 9 is a flow chart for a recognition process performed by the matcher of FIG. 4, in accordance with an embodiment of the invention.

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
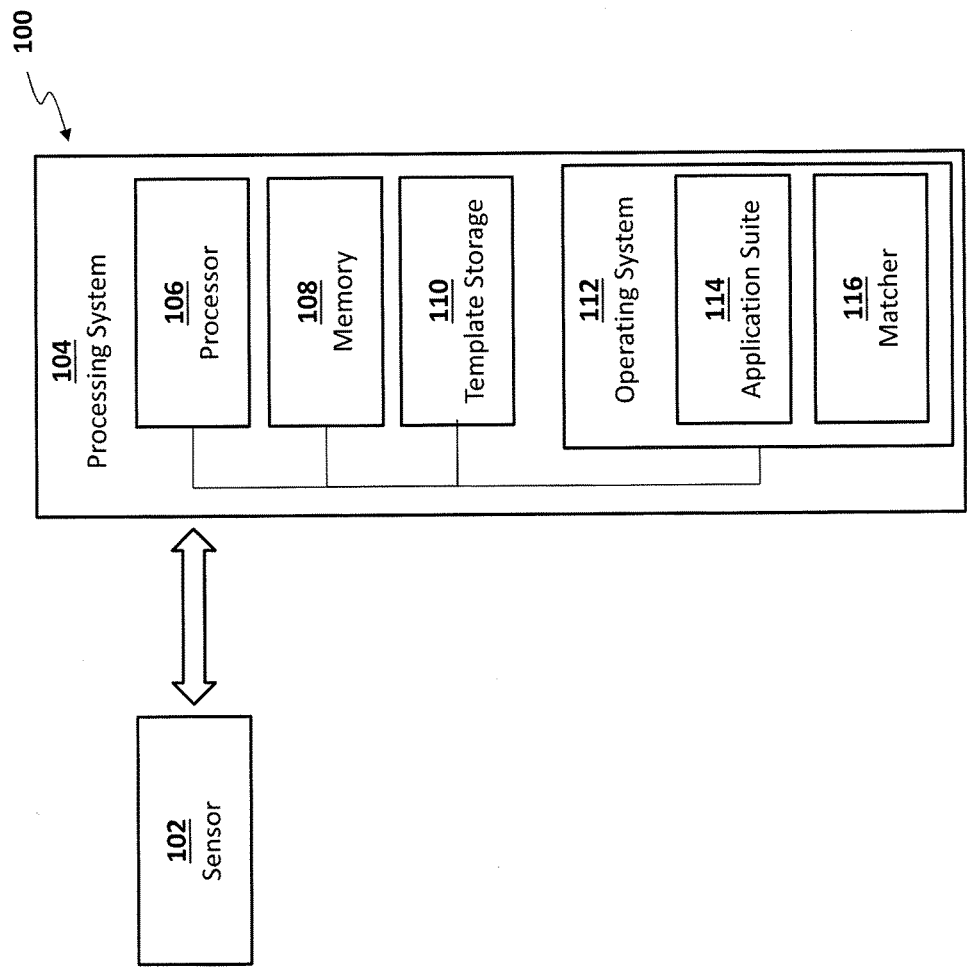
FIG. 1 is a block diagram of an exemplary device that includes an input device and a processing system, in accordance with an embodiment of the invention.

Turning now to the figures, FIG. 1 is a block diagram of an electronic system or device 100 that includes an input device such as sensor 102 and processing system 104, in accordance with an embodiment of the invention. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. As appropriate, the sensor 102 may communicate with parts of the electronic device 100 using any one or more of the following: buses, networks, and other wired or wireless interconnections. Examples include I$^2$C, SPI, PS/2, Universal Serial Bus (USB), Bluetooth, RF, and IRDA.

In some embodiments, sensor 102 will be utilized as a fingerprint sensor utilizing one or more various electronic fingerprint sensing methods, techniques and devices to capture a fingerprint image of a user. In other embodiments, others type of biometric sensors or input devices may be utilized instead of or in addition to the fingerprint sensor to capture a biometric sample. For instance, input devices that capture other biometric data such as faces, vein patterns, voice patterns, hand writing, keystroke patterns, heel prints, body shape, and/or eye patterns, such as retina patterns, iris patterns, and eye vein patterns may be utilized. For ease of description, biometric data discussed herein will be in reference to fingerprint data. However, any other type of biometric data could be utilized instead of or in addition to the fingerprint data.

Generally, fingerprint sensor 102 may utilize any type of technology to capture a user's fingerprint. For example, in certain embodiments, the fingerprint sensor 102 may be an optical, capacitive, thermal, pressure, radio frequency (RF) or ultrasonic sensor. Optical sensors may utilize visible or invisible light to capture a digital image. Some optical sensors may use a light source to illuminate a user's finger while utilizing a detector array, such as a charge-coupled device (CCD) or CMOS image sensor array, to capture an image.

Regarding capacitive sensors, capacitive sensing technologies include two types: passive and active. Both types of capacitive technologies can utilize similar principles of capacitance changes to generate fingerprint images. Passive capacitive technology typically utilizes a linear one-dimensional (1D) or a two-dimensional (2D) array of plates (i.e., electrodes or traces) to apply an electrical signal, e.g., in the form of an electrical field, such as a varying high speed (RF or the like) signal transmitted to the finger of the user from a transmitter trace and received at a receiver trace after passage through the finger. A variation in the signal caused by the impedance of the finger indicates, e.g., whether there is a fingerprint valley or ridge between the transmitter trace and the receiver trace in the vicinity of where the transmission and reception between the traces occurs. Fingerprint ridges, as an example, can typically display far less impedance (lower capacitance across the gap) than valleys, which may exhibit relatively high impedance (higher capacitance across the gap). The gaps can be between traces on the same plane, horizontal, vertical or in different planes.

Active capacitive technology is similar to passive technology, but may involve initial excitation of the epidermal skin layer of the finger by applying a current or voltage directly to the finger. Typically, thereafter, the actual change in capacitance between the source of the voltage or current on an excitation electrode (trace) and another receptor electrode (trace) is measured to determine the presence of a valley or ridge intermediate the source electrode and the another receptor electrode.

In some embodiments of the capacitive sensor, the traces may form a plurality of transmitter electrodes and a single receiver electrode or a plurality of receiver electrodes and a single transmitter electrode arranged in a linear one dimensional capacitive gap array. In such embodiments, the capacitive gap may be horizontal across the gap formed by the respective ends of the plurality of traces and the single trace, whether transmitter or receiver.

In some embodiments of the capacitive sensor, the traces may form a 2D grid array, e.g., with rows of transmitter/receiver traces on one substrate and columns of receiver/transmitter traces on the same or a separate substrate, e.g., laminated together with some form of dielectric between the traces to form a 2D sensor element array. A 2D array may also be formed using a 2D matrix of sensing electrodes. Such 2D arrays may form a 2D placement sensor array (also sometimes known as an "area sensor" or "touch sensor") or a 2D swipe sensor array (also sometimes known as a "slide sensor"). A swipe sensor may also be formed from a one or more 1D arrays or linear arrays.

Regarding thermal sensors, when a finger is presented to a thermal sensor, the fingerprint ridges make contact with the sensor surface and the contact temperature is measured. The ridges contact the sensor and yield a temperature measurement, while the valleys do not make contact and are not measured beyond some captured ambient noise. A fingerprint image is created by the skin-temperature of the ridges that contact the sensor and the ambient temperature measure for valleys.

Regarding pressure sensors, there are two types of pressure sensing detectors available, which include conductive film detectors and micro electro-mechanical devices (MEMS). Conductive film sensors use a double-layer electrode on flexible films. Accordingly, a user who presses their finger to the flexible films will leave an imprint that is utilized to capture an image of the fingerprint. MEMS sensors use small silicon switches on a silicon chip, such that when a fingerprint ridge touches a switch, it closes and generates an electronic signal. The electronic signals are detected and utilized to create an image of the fingerprint pressed to the MEMS sensor.

Regarding RF sensors, a user's finger is pressed to the sensor, which in turn applies an RF signal to the fingerprint touched to the sensor. The fingerprint reflects a portion of the applied RF signal which is in turn detected by a pixel array of the sensor. The detected signal is utilized to create a fingerprint image of the user's fingerprint.

Regarding ultrasonic sensors, these types of sensor utilized very high frequency sound waves to penetrate an epidermal layer of skin of a user's fingerprint pressed to the sensor. Typically, the sound waves are generated using a piezoelectric transducer, which also functions to receive the sound waves reflected from the user's fingerprint. These reflected sound waves are detected and utilized to create an image of the user's fingerprint.

Biometric image sensors, such as fingerprint sensors, such as the sensor 102, which detect and measure features of the surface of a finger using one or more of optical, capacitive, thermal, pressure, RF and ultrasonic technologies, as discussed above, sometimes fall into one of two categories: (1) placement sensors and (2) typically smaller swipe sensors. Placement sensors have an active sensing surface that is large enough to accommodate at least a portion of the relevant part of the fingerprint of the finger during a single scan or sensing action. Generally, the placement sensors are rectangular in shape with a sensing surface area that ranges from around 100 mm×100 mm down to 10 mm×10 mm, or in some instances smaller than 10 mm×10 mm. Accordingly, for small size placement sensors, only a portion of the fingerprint will be captured either for immediate use in a recognition process or as part of a fingerprint template for later use in the recognition process. Additionally, in certain embodiments, the placement sensor could have a non-rectangular shape and sensing surface area. Typically, for placement sensors, the finger is held stationary over the sensing surface during a measurement. Generally, during a fingerprint enrollment process, multiple views of the fingerprint image will be captured.

Generally, swipe sensors are smaller in size than placement sensors and require the finger to be moved over the sensor during a measurement. Typically, the finger movement will be either 1D in that the finger moves in a single direction over the sensor surface, or the finger movement can be 2D in that the finger can move in more than one direction over the sensor surface during a measurement. Generally, a fingerprint image captured during a single frame will only be of a portion of a user's fingerprint, and the sensor will capture a series of frames as the user swipes their finger over the sensor so that a larger area of the fingerprint can be captured in a single user input. The larger area may encompass a full fingerprint, or it may still encompass only a partial fingerprint, such as in a swipe sensor having a width less than the full width of the finger.

Turning now to the processing system 104 from FIG. 1, basic functional components of the electronic device 100 utilized during capturing and storing a user fingerprint image are illustrated. The processing system 104 includes a processor 106, a memory 108, a template storage 110 and an operating system (OS) 112 hosting an application suite 114 and a matcher 116. Each of the processor 106, the memory 108, the template storage 110 and the operating system 112 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 also hosts an operating system 112. The operating system 112 controls operations of the components of the processing system 104. For example, the operating system 112 facilitates the interaction of the processor(s) 106, memory 108 and template storage 110. The operating system 112 further hosts the application suite 114. The application suite 114 contains applications utilizing data stored on the memory 108 or the template storage 110 or data collected from interface devices such as the sensor 102 to cause the processing system 104 to perform certain functions. For instance, in certain embodiments, the application suite 114 hosts an enroller application, which functions to capture one or more views of the user's fingerprint. The views or fingerprint images generally contain a partial or full image of the user's fingerprint, and they may be raw images or feature sets extracted from the raw images. The enrollment application generally instructs the user to hold or swipe their finger across the sensor 102 for capturing the image. After each requested image is captured, the enrollment application typically stores the captured image in the template storage 110. In certain embodiments, the enrollment application will cause the data representing the captured image to undergo further processing. For instance, the further processing may be to compress the data representing the captured image such that it does not take as much memory within the template storage 110 to store the image.

In certain embodiments, the application suite 114 will also contain applications for authenticating a user of the electronic device 100. For example, these applications may be an OS logon authentication application, a screen saver authentication application, a folder/file lock authentication application, an application lock and a password vault application. In each of these applications, the individual application will cause the operating system 112 to request the user's fingerprint for an authentication process prior to undertaking a specific action, such as providing access to the OS 112 during a logon process for the electronic device 100. To perform this process, the above listed applications will utilize the matcher 116 hosted by the operating system 112.

Figure 2B:
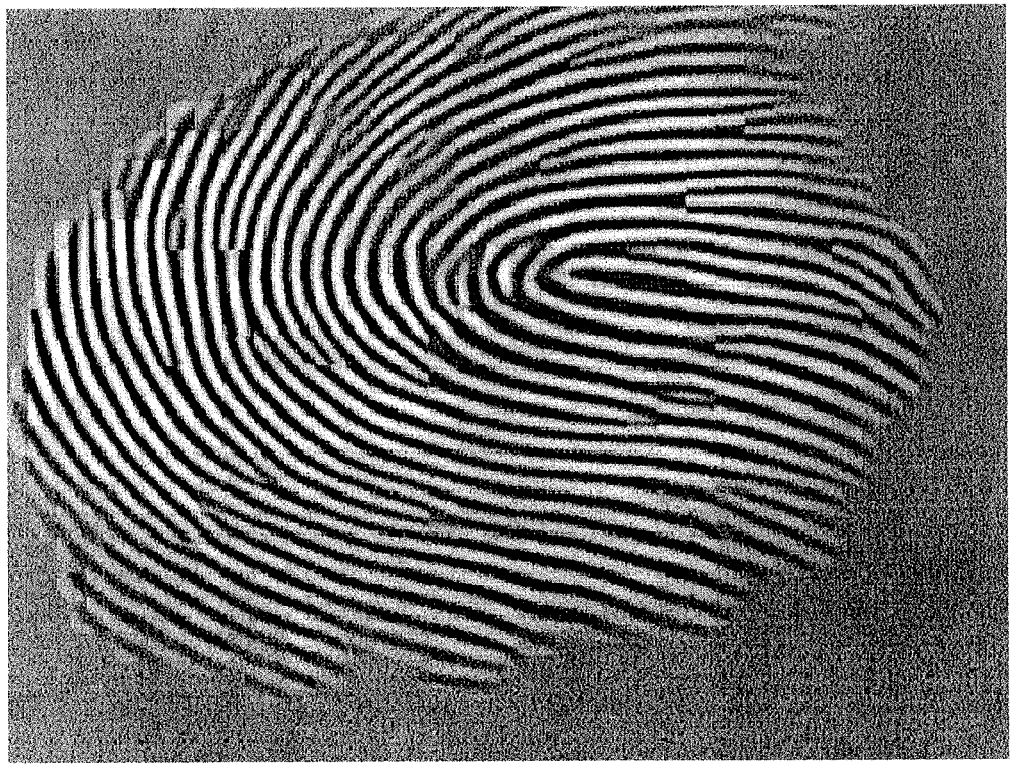
Figure 2A:
FIG. 2a is an image of a fingerprint.

The matcher 116 of the operating system 112 functions to compare the fingerprint image or images stored in the template storage 110 with a newly acquired fingerprint image or images from a user attempting to access the electronic device 100. In certain embodiments, the matcher 116, or other process, will further perform image enhancement functions for enhancing a fingerprint image. An example of the image enhancement function is illustrated in FIGS. 2a and 2b. FIG. 2a illustrates an unenhanced fingerprint image that shows various ridges and minutiae of a fingerprint. As can be seen in FIG. 2a, the image is noisy such that portions of the image are cloudy and the ridges or contours are broken. FIG. 2b illustrates the same fingerprint after the matcher 116 has performed the image enhancement function. As can be seen, the image enhancement function removes much of the noise such that the image is no longer cloudy and the ridges are no longer broken.

Figure 3:
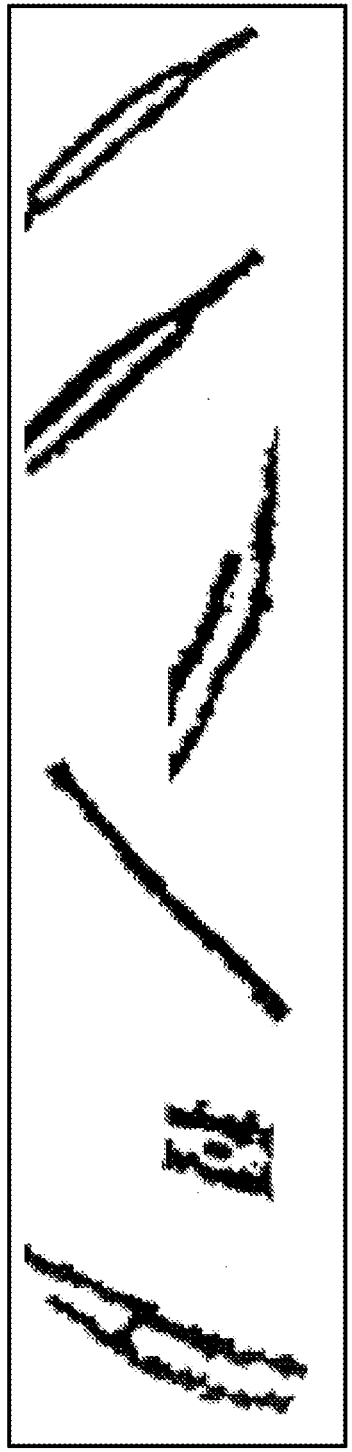
FIG. 3 is an illustration of various types of minutiae points of a fingerprint.

In certain embodiments, the matcher 116, or other process, is also configured to perform feature extraction from the fingerprint image or images of the user. During feature extraction, the matcher 116 will extract unique features of the user's fingerprint to derive a verification template used during matching. Various discriminative features may be used for matching, including: minutia matching, ridge matching, ridge flow matching, or some combination thereof. If authentication is performed using minutia features, the matcher 116 will scan the captured view of the user's fingerprint for minutia. FIG. 3 illustrates various types of fingerprint minutia, including, from left to right, a bridge point between two or more ridges, a dot, an isolated ridge, an ending ridge, a bifurcation point and an enclosure. During extraction, the matcher 116 acquires a location and orientation of the minutia from the fingerprint and compares it to previously captured location and orientation information of minutia from the fingerprint image or images in the template storage 110.

The matcher may compare the verification template to the enrollment template to compute a composite match score between the templates. If the composite match score satisfies a threshold, the match 116 indicates a match. Otherwise, a non-match may be indicated.

In embodiments of the invention, an enrollment template may contain multiple enrolled views of the user's fingerprint. Each of the enrolled views may be stored separately, along with the geometric relationships between the views. Alternatively, instead of pre-computing the geometric relationships between the enrollment views and storing them in the enrollment template, the geometric relationships can be computed at match time prior to each match attempt. The matcher 116 may calculate a composite match score between the verification template and the enrollment template based on individual match statistics derived from comparing a verification view of the verification template with each individual enrollment view in the enrollment template, or some subset of the individual enrollment views in the enrollment template. The individual match statistics may be collectively analyzed, along with inter-view match statistics between enrollment views within the enrollment template to calculate a composite match score. The inter-view match statistics between the enrollment views may be pre-computed and stored in the enrollment template, or may be computed at match time.

The composite match score may be calculated as a function of both the individual match statistics and the inter-view match statistics. For example, individual match scores may be computed based on comparing the verification view with a plurality of individual enrollment views in the enrollment template. Instead of simply combining these individual scores, the matcher may combine these scores along with some adjustment based on the inter-view match statistics between individual enrollment views. As another example, feature vectors from the inter-view match statistics and individual match statistics, such as transformation errors, number of predicted matches, number of non-predicted matches, etc. can be derived from the relationships between enrollment views and fed into a neural network or other machine learning classifier to calculate an overall composite match score.

FIG. 4 illustrates an embodiment of the matcher 116 of FIG. 1, which uses a machine learning classifier to calculate a composite match score. In the embodiment illustrated in FIG. 4, the matcher 116 includes a matching module 402 that utilizes a fingerprint enrollment template 404 for a recognition process. As used herein, a recognition process includes authentication or verification processes, which are utilized to verify a user by determining whether a match is found with confidence between a biometric sample captured by an input device and an enrollment template previously captured from the user. Additionally, the recognition process could also pertain to an identification process, which functions to identify a user based on the user's verification template being compared to a database containing a plurality of enrollment templates.

The fingerprint enrollment template 404 includes a plurality of fingerprint views of a user's fingerprint. In the illustrated embodiment, the fingerprint enrollment template 404 includes four enrollment views, $E_1$, $E_2$, $E_3$ and $E_4$. In the illustrated embodiment, the recognition process is being used for a user fingerprint view 406. The matching module 402 determines match statistics between the fingerprint enrollment template 404 and the fingerprint verification view 406. The match statistics may include individual match statistics computed by comparing the verification view 406 to each of the individual enrollment views 404. The match statistics are provided to a machine learning module 408, which in turn calculates a composite multi-view match score 410. The composite multi-view match score 410 provides an indication of confidence of a match between the verification fingerprint view 406 and the fingerprint enrollment template 404.

In one embodiment, the machine learning module uses a neural network to calculate the composite score. However, the machine learning module may use other scoring methods, such as support vector machines, random forests, regression models, and the like.

The machine learning module 408, in addition to the individual match statistics determined by the matching module 402, in certain embodiments, utilizes inter-view match statistics to calculate the composite multi-view match score 410. The inter-view match statistics represent match statistics between enrollment views of the fingerprint enrollment template 404.

Figure 5:
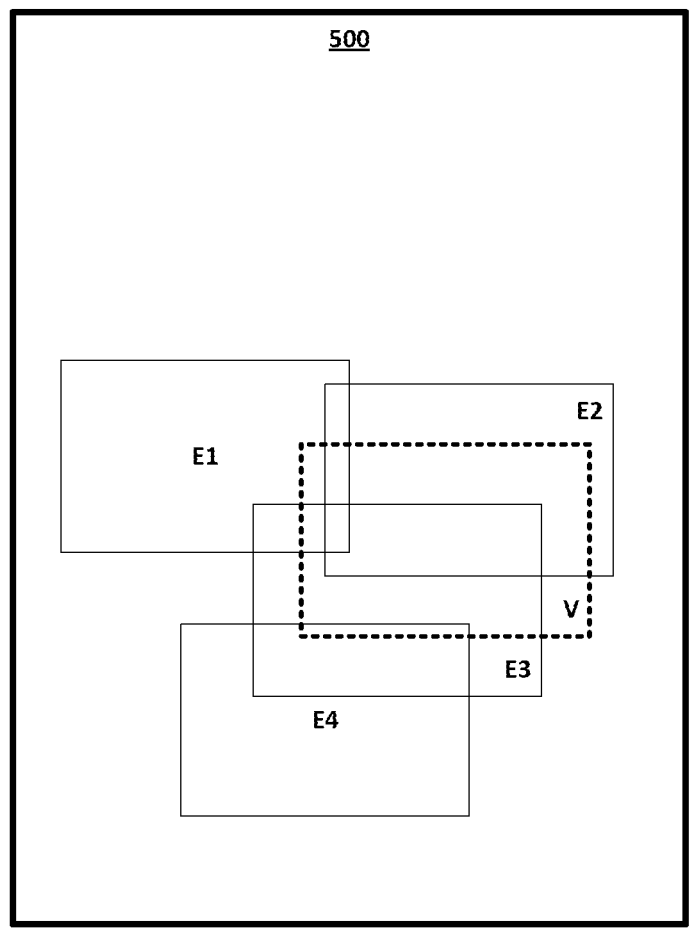
FIG. 5 is a schematic diagram of possible fingerprint views for use by the matcher of FIG. 4, in accordance with a particular embodiment of the invention.

FIG. 5 illustrates a geographical layout of the enrollment views $E_1$, $E_2$, $E_3$ and $E_4$ and the verification fingerprint view 406 within a fingerprint image boundary 500, according to an example embodiment. The fingerprint image boundary represents a total surface area a user's fingerprint image, when captured, may encompass. In this example, each enrollment view and the verification fingerprint view 406 represent only partial images of the overall fingerprint 500. The portion of the fingerprint captured in the enrollment views and the verification fingerprint view 406 will be determined by how a user interacts with the sensor 102 (see FIG. 1). In this regard, the enrollment views and the verification fingerprint view 406 may be geographically dispersed over the potential surface area of the fingerprint represented by the fingerprint image boundary 500. As illustrated, the enrollment views and the verification fingerprint view 406 represent portions of the fingerprint and therefore will contain discriminative features such as ridges and valleys, ridge flows, and/or fingerprint minutia, etc., as illustrated in FIG. 3.

The individual match statistics and/or inter-view match statistics that are collected can vary in different implementations.

In certain embodiments, the match statistics, including the individual match statistics between the verification view and the individual enrollment views, the inter-view match statistics between the enrollment views, or both, takes into account any geometric relationship between the boundaries of the enrollment views and the verification fingerprint view 406. For instance, the geometric relationship may include a geometric transformation between the enrollment views and the verification fingerprint view 406. The transformation may be performed in any one or more coordinate systems, including, but not limited to a Cartesian coordinate system, a polar coordinate system, a spherical coordinate system or a cylindrical coordinate system. For example, in an embodiment relying on the Cartesian coordinate system, the geometric transformation would include a translation in the x direction "Dx" and/or a translation in the y direction "Dy."

Additionally, the enrollment views and the verification fingerprint view 406 are illustrated as just being boxes; however, each box will contain a portion of a fingerprint that depending on how the user interacts with the sensor 102 (see FIG. 1) may not only be of a different portion of the fingerprint but also may have a different rotation from the other boxes. Therefore, an additional point for collection as a match statistic may be a rotation Dtheta between each of the enrollment views and the verification fingerprint view 406.

Furthermore, as mentioned, each of the enrollment views and the verification fingerprint view 406 may contain certain minutia points. In embodiments relying on minutia features, a number of matched minutia points "k" may be utilized as part of the match statistics.

In certain embodiments, the individual match statistics and/or inter-view match statistics include a match score. The individual or inter-view match score may be determined by comparing the views according to some matching metric between features in the views. If minutia-based matching is used, for example, the match score may be correlated to a number of matching minutia between the views, which in turn may be correlated to an amount of overlap between compared views. Other scoring methods may exhibit similar correlation between amount of overlap and match score. Thus, in some implementations, a greater amount of overlap resulting from the geometric transformation between views will correspond to a stronger match score, and similarly a lower amount of overlap between views will correspond to a weaker match score.

In some embodiments, predicted weak matches, strong matches, or non-matches can be derived from an individual geometric transformation of the verification view and interview geometric transformations between the enrollment views. Accordingly, in the illustrated embodiment, the verification fingerprint view V overlaps strongly with both $E_2$ and $E_3$ overlaps minimally with both $E_1$ or $E_4$. Therefore, a strong match score should exist for the match statistics between the verification fingerprint view V and $E_2$ and $E_3$, while the match score between the verification fingerprint view V and $E_1$ and $E_4$ should be low. In this example, these match statistics can be predicted and the composite match score can be adjusted based on consistency between these predicted match scores and the actually computed individual match scores. For example, the inter-view geometric transformations among $E_1$, $E_2$, $E_3$, and $E_4$, and the individual geometric transformation of V to $E_2$, indicates that one strong match and two weak matches should be expected when computing the individual match scores for V against $E_1$, $E_3$, and $E_4$. If the actual individual match scores are consistent with this prediction, e.g., one strong match and two weak matches are determined, the composite score may include an increase due to this high consistency. Alternatively, if the actual individual match scores deviate significantly from this prediction, the composite match score may decrease.

Figure 6:
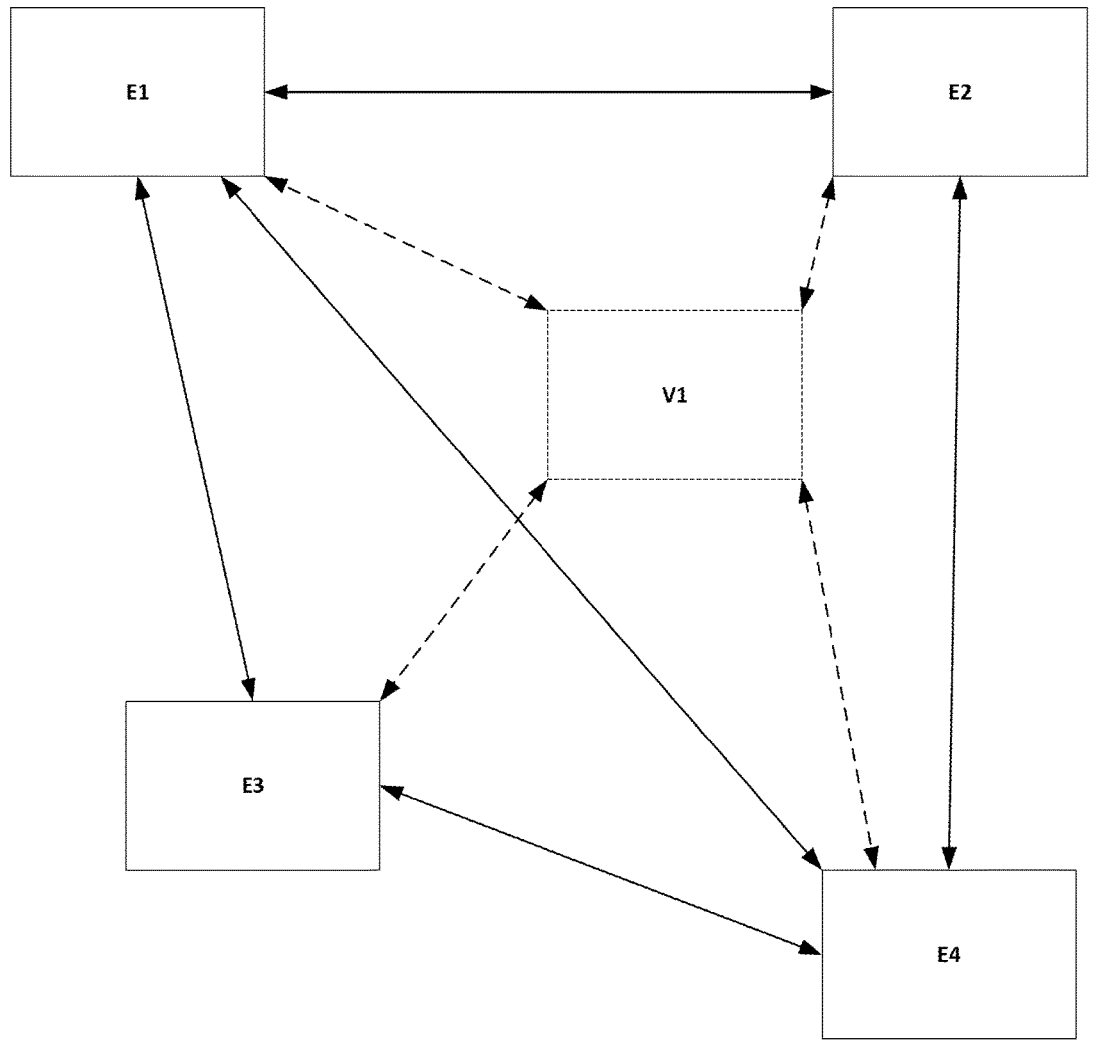
FIG. 6 is graphical representation of match statistics between a verification view and a plurality of enrollment views from an enrollment template, in accordance with an embodiment of the invention.

As mentioned previously, all of the above mentioned match statistics are not only determined for the enrollment views compared against the verification fingerprint view 406 but also between each of the enrollment views $E_1$, $E_2$, $E_3$ and $E_4$. This collection 600 of match statistics is geometrically illustrated in FIG. 6. In FIG. 6, the solid lines represent inter-view match statistics between individual enrollment views in the fingerprint enrollment template 404 (see FIG. 4), and the dashed lines represent match statistics between the verification fingerprint view 406 and the individual enrollment views in the fingerprint enrollment template 404. In some embodiments, the match statistics collected include a match score, a geometric translation in the x-direction Dx, a geometric translation in the y-direction Dy, a rotation Dtheta, the number of matched minutia k, and/or a number of non-matched minutia. Other match statistics can be collected, and the specific set of match statistics collected and used to calculate the composite match score can vary from embodiment to embodiment.

Based on a portion or all of the acquired match statistics illustrated in FIG. 6, the composite multi-view match score 410 (see FIG. 4) can be determined. By utilizing the match statistics represented by the dashed lines in FIG. 6, the matcher 116 (see FIG. 1) will be able to improve the reliability of the calculation of the composite multi-view match score 410.

FIGS. 7-8 depict examples of composite match score calculations using consistency checks between the individual match statistics and the inter-view match statistics.

FIGS. 7(a)-7(c) depicts an example in which matched minutia in the individual match statistics and inter-view match statistics are compared, and the composite match score is adjusted based on correspondence therebetween. As shown in FIGS. 7(a)-7(c), verification view V1, and individual enrollment views E1 and E2 all overlap and contain common minutia. FIG. 7(c) shows the match statistics for these minutia ($a_i$, $b_i$, $c_i$) for each of the pairings of views, including both matching minutia (e.g., $a_2$ and $c_3$ match in the pairing of E1 to V1), and non-matching minutia (e.g., neither $a_1$ or $c_2$ match any minutia in the pairing of E1 to V1). As a simplified example, since $a_4$ matches $c_6$ in the individual pairing of E1 to V1 and $a_4$ also matches $b_1$ in the inter-view pairing of E1 to E2, $c_6$ should match $b_1$ in the individual pairing of V1 to E2. The individual match statistics can be compared to the inter-view match statistics regarding matching minutia, and the composite match score can be adjusted accordingly. In this example, the composite score can be increased when the minutia in V1 matches the results from the other statistics.

FIG. 8 depicts an example in which a transformation error is computed by deriving a geometric transformation from the inter-view match statistics, and comparing this to an individual geometric transformation determined by comparing the verification view and an individual enrollment view (e.g., using a standard image alignment technique). In this example, V1 is associated with E1 by transformation T(V1: E1). E1 is associated with E2 by geometric transformation T(E1:E2). From this information, a transformation between V1 and E2 can be derived from these relationships. To compute a transformation error, an individual geometric transformation T'(V1:E2) can be separately computed by direct comparison of V1 to E2 using a standard image alignment technique. The computed transformation and derived transformation can be compared to generate a transformation error. The composite match score can then further be a function of this comparison. For example, the composite match score can be increased or decreased in relation to this transformation error (where a high error or large difference between the transformations indicated inconsistencies that may result in a decrease in the composite match score and vice versa). Alternative, the derived transformations or the transformation error may be used as a feature vector input into a machine learning classifier used to compute a composite match score.

FIG. 9 illustrates a flow chart 700 for a recognition process performed by the matcher 116 of FIGS. 1 and 4, in accordance with an embodiment of the invention. During an enrollment process (not pictured), the matcher 116 acquires the fingerprint enrollment template 404. The fingerprint enrollment template 404 is captured, typically at some point in time prior to performing the recognition process, and stored either locally at the device 100 (see FIG. 1) or externally and uploaded to the device at a later point in time. The enrollment template can be derived from multiple biometric samples captured by a fingerprint sensor or other input device, and may include multiple corresponding enrollment views.

At step 704, the matcher 116 (see FIG. 1) acquires a verification template 406 (see FIG. 4) for use in the recognition process. The verification template includes a verification view of a biometric sample (e.g., a sensed fingerprint), and includes a raw image or a feature set extracted from a raw image. The individual fingerprint view 406 will typically be collected at the time of performing the recognition process to be compared against the previously collected fingerprint enrollment template 404. However, in certain embodiments, the individual fingerprint view 406 may have been previously captured and uploaded to the device for use in the recognition process.

At step 706, the matcher 116 (see FIG. 1) compares the verification view to a plurality of individual enrollment views in the enrollment template to determine individual match statistics between the verification view and each of the individual enrollment view 406 (see FIG. 4) and each view of the fingerprint enrollment template 404. As mentioned previously, in a certain embodiment, these individual match statistics can include a geometric translation, a rotation, and an individual match score. The individual match statistics may be determined against all of the enrollment views in the enrollment template, or only some subset of them.

At step 708, the matcher 116 (see FIG. 1) utilizes the individual match statistics to calculate a composite multi-view match score 410 (see FIG. 4). The composite match score is computed as a function of the individual match statistics and the inter-view match statistics as described above. For example, the composite match score may be a combination of the individual match scores from the previous step, with adjustments based on the inter-view match statistics. Alternatively, it may be calculated using a machine learning scoring module that received the individual match statistics and inter-view match statistics as inputs.

At step 710, the matcher 116 (see FIG. 1) indicates whether a match has been found based on the composite multi-view match score 410. In certain embodiments, this indication is based on a comparison between the composite multi-view match score 410 and a threshold value. If the composite multi-view match score 410 is above the threshold, then a match is indicated with a high level of confidence; however, if the composite multi-view match score 410 is below the threshold, then a non match is indicated.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of biometric matching to an enrollment template, the method comprising:
   comparing a verification view of a verification template to a plurality of individual enrollment views of the enrollment template to determine individual match statistics between the verification view and each individual enrollment view of the plurality of individual enrollment views, wherein the verification view corresponds to a biometric image captured by an input device, wherein the plurality of individual enrollment views correspond to a plurality of different biometric images captured by the input device;
   determining at least one inter-view transformation between at least one pairing of the individual enrollment views, wherein the at least one inter-view transformation includes at least one translation and at least one rotation;
   determining feature vectors from the individual match statistics between the verification view and each individual enrollment view of the plurality of individual enrollment views;
   calculating a composite match score between the verification template and the enrollment template by inputting the feature vectors into a machine learning classifier; and
   indicating a biometric match between the verification template and the enrollment template based on the composite match score.

2. The method of claim 1, wherein at least some of the feature vectors are determined from inter-view match statistics between at least one pairing of the individual enrollment views within the enrollment template.

3. The method of claim 1, wherein at least some of the feature vectors are determined from at least one inter-view geometric transformation between at least one pairing of the individual enrollment views within the enrollment template.

4. The method of claim 1, wherein the feature vectors include a transformation error.

5. A method of biometric matching to an enrollment template, the method comprising:
   comparing a verification view of a verification template to a plurality of individual enrollment views of the enrollment template to determine individual match statistics between the verification view and each individual enrollment view of the plurality of individual enrollment views, wherein the verification view corresponds to a biometric sample captured by an input device;
   determining feature vectors from the individual match statistics between the verification view and each individual enrollment view of the plurality of individual enrollment views;
   calculating a composite match score between the verification template and the enrollment template by inputting the feature vectors into a machine learning classifier; and
   indicating a biometric match between the verification template and the enrollment template based on the composite match score,
   wherein the feature vectors include a transformation error, and
   wherein the method further comprises computing the transformation error from at least one inter-view geometric transformation between at least one pairing of the individual enrollment views within the enrollment template.

6. The method of claim 1, wherein the individual match statistics include a number of matched points.

7. The method of claim 1, wherein the individual match statistics include a number of non-matched points.

8. The method of claim 1, wherein the machine learning classifier comprises a neural network.

9. The method of claim 2, wherein the biometric match is indicated in response to determining that the composite match score satisfies a threshold.

10. The method of claim 1, further comprising:
    capturing the biometric image with the input device.

11. The method of claim 1, wherein the plurality of individual enrollment views are all individual enrollment views contained in the enrollment template.

12. The method of claim 2, wherein the plurality of individual enrollment views are a subset of all individual enrollment views contained in the enrollment template.

13. A non-transitory computer-readable storage medium storing instructions that, when executed by a processor, causes a computing device to perform a method comprising:
- comparing a verification view of a verification template to a plurality of individual enrollment views of the enrollment template to determine individual match statistics between the verification view and each individual enrollment view of the plurality of individual enrollment views, wherein the verification view corresponds to a biometric image captured by an input device, wherein the plurality of individual enrollment views correspond to a plurality of different biometric images captured by the input device;
- determining at least one inter-view transformation between at least one pairing of the individual enrollment views, wherein the at least one inter-view transformation includes at least one translation and at least one rotation;
- determining feature vectors from the individual match statistics between the verification view and each individual enrollment view of the plurality of individual enrollment views;
- calculating a composite match score between the verification template and the enrollment template by inputting the feature vectors into a machine learning classifier; and
- indicating a biometric match between the verification template and the enrollment template based on the composite match score.

14. The non-transitory computer-readable storage medium of claim 13, wherein at least some of the feature vectors are determined from inter-view match statistics between at least one pairing of the individual enrollment views within the enrollment template.

15. The non-transitory computer-readable storage medium of claim 13, wherein at least some of the feature vectors are determined from at least one inter-view geometric transformation between at least one pairing of the individual enrollment views within the enrollment template.

16. The non-transitory computer-readable storage medium of claim 13, wherein the feature vectors include a transformation error.

17. A non-transitory computer-readable storage medium storing instructions that, when executed by a processor, causes a computing device to perform a method comprising:
- comparing a verification view of a verification template to a plurality of individual enrollment views of the enrollment template to determine individual match statistics between the verification view and each individual enrollment view of the plurality of individual enrollment views, wherein the verification view corresponds to a biometric sample captured by an input device;
- determining feature vectors from the individual match statistics between the verification view and each individual enrollment view of the plurality of individual enrollment views;
- calculating a composite match score between the verification template and the enrollment template by inputting the feature vectors into a machine learning classifier; and
- indicating a biometric match between the verification template and the enrollment template based on the composite match score,
- wherein the feature vectors include a transformation error, and
- wherein the method further comprises computing the transformation error from at least one inter-view geometric transformation between at least one pairing of the individual enrollment views within the enrollment template.

18. The non-transitory computer-readable storage medium of claim 13, wherein the individual match statistics include a number of matched points.

19. The non-transitory computer-readable storage medium of claim 13, wherein the individual match statistics include a number of non-matched points.

20. The non-transitory computer-readable storage medium of claim 13, wherein the machine learning classifier comprises a neural network.

21. The non-transitory computer-readable storage medium of claim 14, wherein the biometric match is indicated in response to determining that the composite match score satisfies a threshold.

22. A device for fingerprint matching to an enrollment template, the device comprising:
- a fingerprint sensor; and
- a processor configured to:
  - compare a fingerprint view of a fingerprint template to a plurality of individual enrollment views of the enrollment template to determine individual match statistics between the fingerprint view and each individual enrollment view of the plurality of individual enrollment views, wherein the fingerprint view corresponds to a fingerprint image captured by the fingerprint sensor, wherein the plurality of individual enrollment views correspond to a plurality of different fingerprint images captured by the fingerprint sensor;
  - determine at least one inter-view transformation between at least one pairing of the individual enrollment views, wherein the at least one inter-view transformation includes at least one translation and at least one rotation;
  - determine feature vectors from the individual match statistics between the fingerprint view and each individual enrollment view of the plurality of individual enrollment views;
  - calculate a composite match score between the fingerprint template and the enrollment template by inputting the feature vectors into a machine learning classifier; and
  - indicate a fingerprint match between the fingerprint template and the enrollment template based on the composite match score.

23. The device of claim 22, wherein the feature vectors include a transformation error.

24. The device of claim 22, wherein the individual match statistics include a number of matched points.

25. The device of claim 22, wherein the individual match statistics include a number of non-matched points.

26. The method of claim 1, wherein the input device is only large enough to capture a partial image of a biometric sample, and wherein the plurality of different biometric images correspond to a plurality of different partial images captured by the input device.

27. The non-transitory computer-readable storage medium of claim 13, wherein the input device is only large enough to capture a partial image of a biometric sample, and wherein the plurality of different biometric images correspond to a plurality of different partial images captured by the input device.

28. The device of claim 22, wherein the fingerprint sensor is only large enough to capture a partial image of a fingerprint, and wherein the plurality of different fingerprint images correspond to a plurality of different partial images captured by the fingerprint sensor.

* * * * *